A. V. GULLBORG.
HANDLE AND METHOD OF MAKING THE SAME.
APPLICATION FILED DEC. 21, 1918.
1,365,985. Patented Jan. 18, 1921.
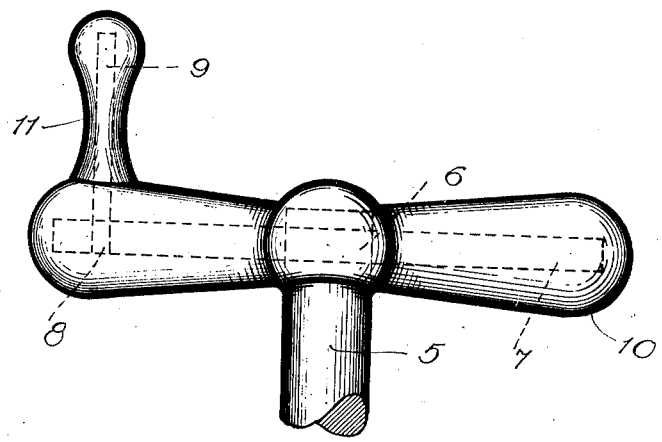
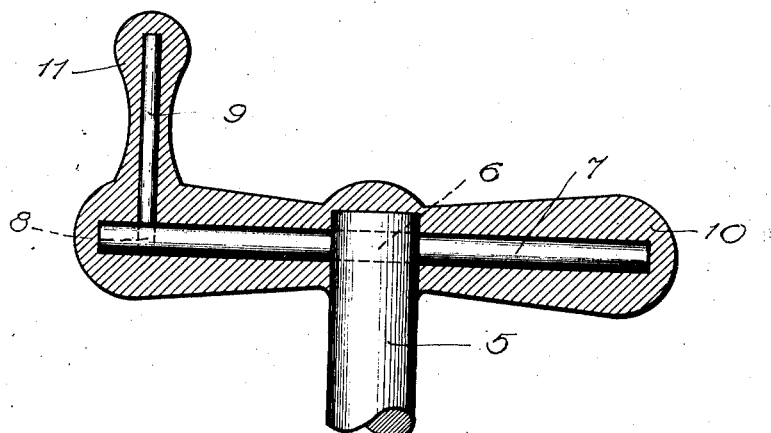

UNITED STATES PATENT OFFICE.

ARTHUR V. GULLBORG, OF CHICAGO, ILLINOIS, ASSIGNOR, BY MESNE ASSIGNMENTS, TO THE BASSICK MANUFACTURING COMPANY, A CORPORATION OF DELAWARE.

HANDLE AND METHOD OF MAKING THE SAME.

1,365,985.     Specification of Letters Patent.    Patented Jan. 18, 1921.

Application filed December 21, 1918. Serial No. 267,857.

*To all whom it may concern:*

Be it known that I, ARTHUR V. GULLBORG, a citizen of the United States, residing at Chicago, in the county of Cook and State of Illinois, have invented certain new and useful Improvements in Handles and Methods of Making the Same, of which the following is a full, clear, concise, and exact description, reference being had to the accompanying drawings, forming a part of this specification.

This invention relates to handles and a method for making the same. The objects of the invention are, first, to provide a simple and durable handle structure; and, second, to provide a method for economically manufacturing these handles.

Other objects will appear as the description progresses, reference being had to the accompanying drawings, in which—

Figure 1 is a side elevation of my improved handle; and

Fig. 2 is a longitudinal section therethrough.

Similar characters of reference refer to similar parts in both views.

Referring to the drawings the reference character 5 indicates a stem or shank which is to be rotated in order to adjust any desired mechanism or for any other desired purpose. Adjacent its outer end the shank 5 is provided with a bore or opening 6, shown in dotted outline in both figures, through which the rod 7 is inserted. Adjacent one end of the rod 7 is an opening 8 which receives the lower end of the rod 9. In forming the handle I assemble the shank 5 and the rods 7 and 9 in the manner just described, and then die cast a suitable metal inclosure 10 about the end of the shank 5 and the rods 7 and 9, so as to completely embed these portions of the handle and prevent them from moving relatively to each other.

From the above description it will be clear that the rod 7 and the die cast metal inclosure 10 mutually lock each other to the end of the shank 5, and that the rods 7 and 9 reinforce those portions of the die cast metal which inclose these rods.

By the above method I am able to produce a handle structure with but comparatively little machining, the only machining necessary being that required to provide the holes 6 and 8 through which the rods 7 and 9 are respectively inserted, and this is a mere drilling operation. The cost thereof is very small. The exterior of the die casting can be very easily provided with a suitable finish, thereby furnishing a smooth neat handle structure at a very low cost.

Other adaptations and modifications of my invention will be apparent to those skilled in this art. My invention is of course not limited to providing handles for a shank 5 which is to be rotated, but can be used for providing handles of any type.

Having thus described my invention, what I claim is:

1. A handle structure comprising a shank provided with a transverse opening, a rod extending through said opening and provided adjacent one end with a transverse opening, a second rod inserted in said second opening, and a unitary die cast metal inclosure embedding the end of said shank and said rods and preventing movement of said shank and rods relative to each other.

2. A handle structure comprising a shank provided with a transverse opening, a rod extending through said opening and provided adjacent one end with a transverse opening, a second rod inserted in said second opening, and a die cast metal inclosure embedding the end of said shank and said rods and preventing movement of said shank and rods relative to each other.

3. A handle structure comprising a shank provided with a transverse opening, a rod extending through said opening, and a metal inclosure forming an elongated handle embedding the end of said shank and said rod and preventing movement of said shank and rod relatively to each other, the said rod reinforcing said metal inclosure against bending stresses.

In witness whereof, I hereunto subscribe my name this 14th day of December, 1918.

ARTHUR V. GULLBORG.

Witnesses:
    JOHN E. CARLSON,
    JOHN L. STEFFEN.